United States Patent
Moon

(10) Patent No.: US 7,595,846 B2
(45) Date of Patent: Sep. 29, 2009

(54) BI-DIRECTIONAL REMOTE CONTROLLER AND DATA BROADCASTING GUIDANCE SYSTEM AND METHOD USING THE SAME

(75) Inventor: Han Moon, Seoul (KR)

(73) Assignee: LG Electronics Inc., Seoul (KR)

(*) Notice: Subject to any disclaimer, the term of this patent is extended or adjusted under 35 U.S.C. 154(b) by 448 days.

(21) Appl. No.: 10/667,610

(22) Filed: Sep. 23, 2003

(65) Prior Publication Data

US 2004/0107444 A1 Jun. 3, 2004

(30) Foreign Application Priority Data

Nov. 29, 2002 (KR) .................. 10-2002-0075507

(51) Int. Cl.
*H04N 5/445* (2006.01)
*H04N 7/173* (2006.01)

(52) U.S. Cl. ............... 348/734; 348/465; 348/14.05; 348/473; 348/563; 340/426.13

(58) Field of Classification Search ............... 348/734, 348/14.05, 465, 473, 474, 563; 340/426.13, 340/426.15, 815.6; 725/51, 52, 60, 61, 109, 725/110, 136

See application file for complete search history.

(56) References Cited

U.S. PATENT DOCUMENTS

| 5,564,073 | A * | 10/1996 | Takahisa ................. 455/3.06 |
| 6,611,958 | B1 * | 8/2003 | Shintani et al. ............ 725/58 |
| 6,665,873 | B1 * | 12/2003 | Van Gestel et al. ......... 725/136 |
| 6,766,528 | B1 * | 7/2004 | Kim et al. ................ 725/113 |
| 6,806,913 | B2 * | 10/2004 | Kim et al. ................ 348/563 |
| 6,867,815 | B2 * | 3/2005 | Kim et al. ................ 348/465 |
| 6,924,748 | B2 * | 8/2005 | Obradovich et al. ........ 340/905 |
| 7,110,714 | B1 * | 9/2006 | Kay et al. ................ 455/3.02 |
| 2004/0075774 | A1 * | 4/2004 | Chang et al. ............. 348/729 |

* cited by examiner

*Primary Examiner*—David L Ometz
*Assistant Examiner*—Jean W Désir
(74) *Attorney, Agent, or Firm*—Birch, Stewart, Kolasch & Birch, LLP

(57) ABSTRACT

Disclosed is a data broadcasting guidance system and method which guides a user and enhances the availability of the data broadcasting. The data broadcasting guidance system includes means for extracting guidance information while a data broadcasting is displayed; means for requesting a guidance on the data broadcasting; and means for notifying the extracted guidance information in response to the request from the requesting means. Accordingly, the guidance information to navigate the data broadcasting is supplied and the remote controller is controlled more exactly and faster so that the user's attention is drawn to the data broadcasting and the broadcast gets popular.

17 Claims, 8 Drawing Sheets

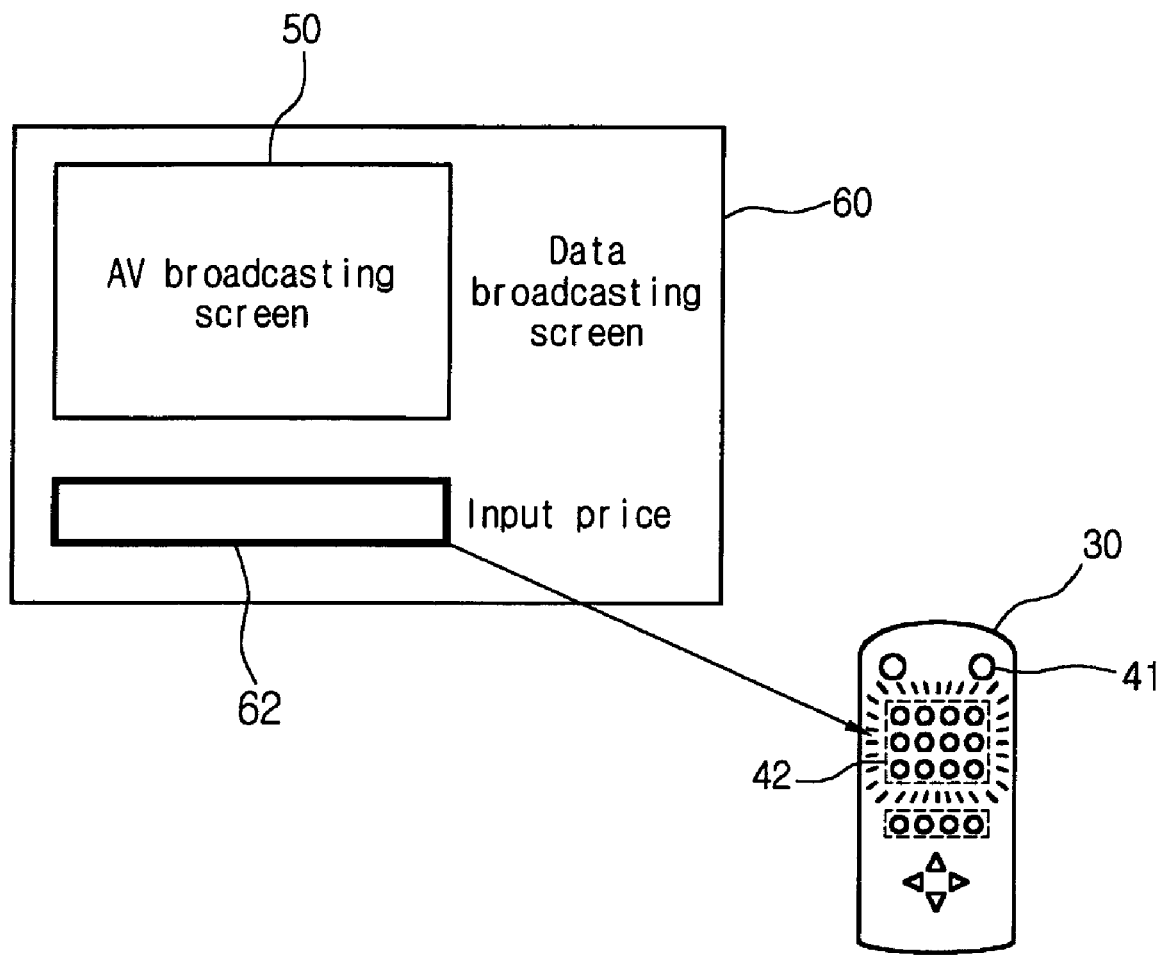

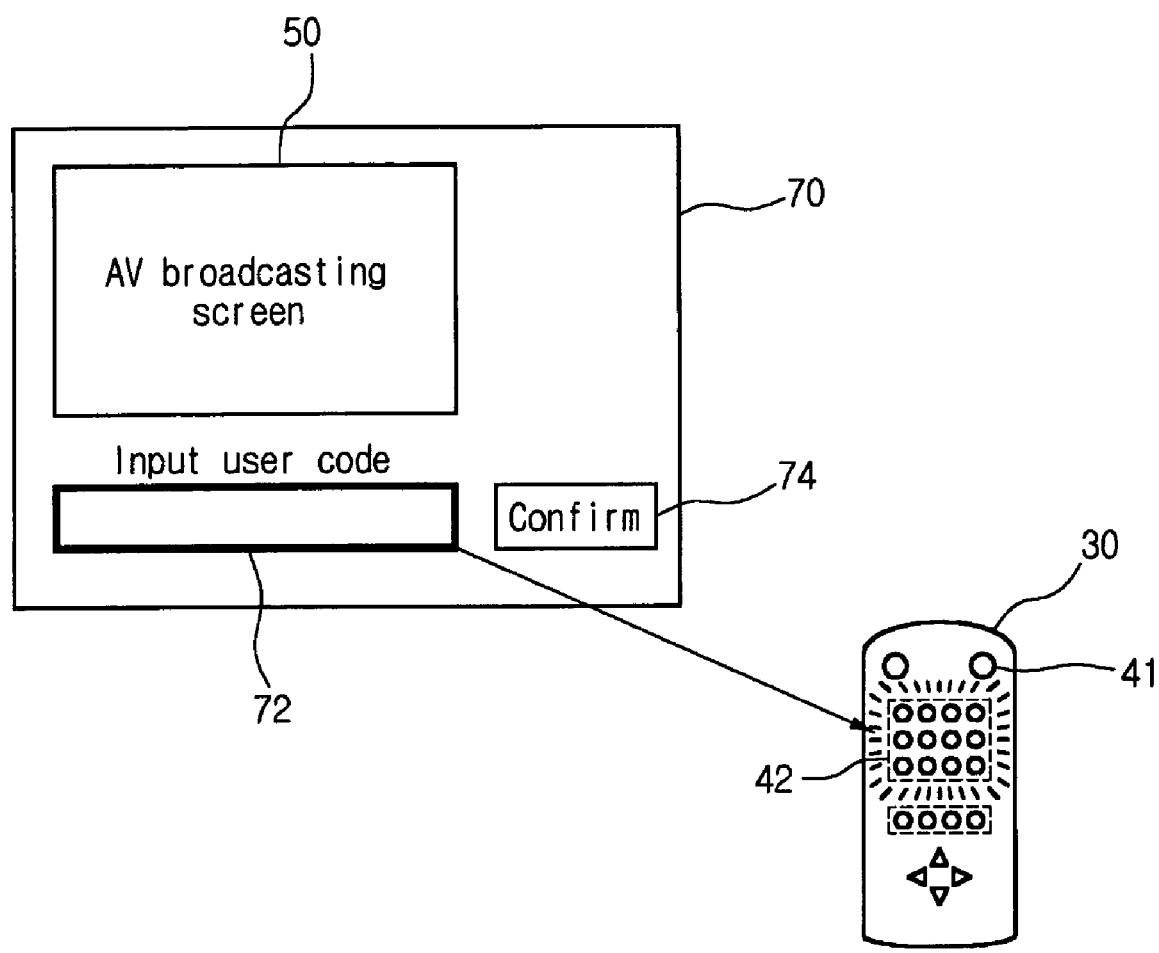

BI-DIRECTIONAL REMOTE CONTROLLER AND DATA BROADCASTING GUIDANCE SYSTEM AND METHOD USING THE SAME

This nonprovisional application claims priority under 35 U.S.C. § 119 (a) on Patent Application No(s). 10-2002-0075507 filed in KOREA on Nov. 29, 2002, which is (are) herein incorporated by reference.

BACKGROUND OF THE INVENITON

1. Field of the Invention

The present invention relates to a digital television, and more particularly, to a data broadcasting guidance system and a method thereof for supplying guidance information on data broadcasting using a remote controller that can communicate bi-directionally.

2. Description of the Related Art

Digital broadcasting provides high quality and high fidelity video and audio with and various and convenient functions such as data communication, interactive communication and the like.

Today, the United States decided to employ digital technology in the next generation television, so-called, advanced television (ATV). In Europe, many projects such as HD DIVINE, SPECTRE of the United Kingdom, DIAMOND of France, and the like in proceeding.

Digital television is the next generation television interworking with B-ISDN or computer network and is being studied in many countries.

The transport stream transmitted from the digital broadcast system can include a video/audio broadcasting signal (hereafter, AV broadcasting signal) and a data broadcasting signal. Here, the data broadcasting signal can be made based on a markup language such as HTML of advanced television enhancement forum (ATVEF) or XDML of digital TV application software environment (DASE), or based on JAVA such as Xlet of DASE.

The audience (users) watch an AV broadcasting signal to obtain additional information related to broadcast program, to purchase goods, to search favorite information on climate, stock market or news, or to do home banking by means of the data broadcasting signal described above.

The user can participate in a live program to get goods according to obtained points, and provide news or their opinion to the broadcast program actively.

Accordingly, in the digital broadcast described above, various types of data can be provided besides the image data and the speech data.

Today, such a digital television is coming into wide use rapidly.

Accordingly, many companies are developing the digital television which receives digital broadcasting signals and data broadcasting programs and the peripheral devices used for the digital television.

Especially, as the functions of the digital television and the contents of the data broadcasting get various, the function of the remote controller to which a user inputs instructions to control the digital television gets important more and more.

FIG. 1 illustrates a schematic view of a configuration of a general remote controller exterior.

Referring to FIG. 1, a remote controller 100 comprises a power button key 102 to turn the power on or off, an arrow button key unit 108 including an up-arrow key, a down-arrow key, a left-arrow key and a right-arrow key, for controlling volume and channel, and a numerical button key unit 104 for inputting letters and numbers, and a function key unit 106 including a confirmation key, a cancellation key and other function keys to control various data broadcast. Here, the arrow button key unit 108, the numerical button key unit 104 and the function button key unit 106 include a plurality of button keys respectively.

FIG. 2 illustrates that the data broadcasting is controlled using a general remote controller.

Referring to FIG. 2, when a data broadcasting starts, an AV broadcasting signal is displayed on an AV broadcasting screen 200 and a data broadcasting signal is displayed on a data broadcasting screen 210. Here, the data broadcasting screen is generated additionally due to the user's request. Generally, if data broadcasting is started, the AV broadcasting signal is displayed. Buttons 212 and 214 to navigate the data broadcasting can be displayed on the data broadcasting screen 210.

Here, the buttons 212 and 214 are displayed in different colors. Accordingly, the button keys 216 and 218 included in the function button key unit 106 of the remote controller 100 are displayed in different colors. Here, the buttons 212 and 214 displayed on the data broadcasting screen 210 and button keys 216 and 218 provided on the remote controller 100 are corresponding to each other and displayed in the same colors respectively.

For example, if the button 1 212 displayed on the data broadcasting screen 210 is red, the button key of the remote controller 100 corresponding to the button 1 212 can be displayed red.

Similarly, the buttons 212 and 214 displayed on the data broadcasting screen 210 and button keys 216 and 218 provided on the remote controller 100 are corresponding to each other and displayed in the same colors respectively so that the user can operate the remote controller 100.

However, the method to inform the user of the button to be pushed by colors as described above is useful to normal people but useless to color blind people who can hardly distinguish colors.

Meanwhile, as the digital data broadcasting is wide spread, the various button keys for data broadcasting are additionally provided on the remote controller.

Accordingly, the user should know the button keys corresponding to various functions for the data broadcast.

However, for the people who are not familiar to this environment, it is not easy to operate the complex buttons so that the data broadcasting is turned away and the complex buttons are a large impediment to spreading the data broadcasting widely.

SUMMARY OF THE INVENTION

Accordingly, the present invention is directed to a bi-directional remote controller, data broadcasting guidance system using it and method thereof that substantially obviates one or more problems due to limitations and disadvantages of the related art.

It is an object of the present invention to provide a data broadcasting guidance system and method in which a button key to be pushed by a user is guided in watching data broadcasting to activate the data broadcasting.

It is another object of the present invention to provide a bi-directional remote controller to inform a user of the guidance information provided through the digital television to help the user's operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a bi-directional remote controller includes means for requesting a guidance on a data broadcast; means for receiving guidance information supplied from an outside in response to the request; and means for notifying the received guidance information.

The requesting means is a guidance setting button key. The guidance information is extracted while the data broadcasting is being displayed. The guidance information indicates the location of a button key to be pushed or location of a button key allowed to be pushed.

The bi-directional remote controller further includes means for inputting a response instruction on the guidance information. The inputting means is a button key or a plurality of button keys provided on a portion notified by the notifying means.

The notifying means is a display device or provided at a predetermined portion of the inputting means.

In another aspect of the present invention, a data broadcasting guidance system includes: means for extracting guidance information while a data broadcasting is being displayed; means for requesting a guidance on the data broadcast; and means for notifying the extracted guidance information in response to the request from the requesting means.

The data broadcasting guidance system further includes means for displaying the extracted guidance information in response to the request from the requesting means.

The data broadcasting guidance system further includes means for receiving the extracted guidance information in response to the request from the requesting means.

The data broadcasting guidance system further includes means for inputting a response instruction on the guidance information supplied through the notifying means.

The inputting means is a button key or a plurality of button keys provided on a portion notified by the notifying means. The requesting means is a guidance setting button key. The guidance information indicates the location of a button key to be pushed or location of a button key allowed to be pushed. The notifying means is a display device or provided at a predetermined portion of the inputting means.

In another aspect of the present invention, a method for guiding a data broadcasting includes the steps of: (a) extracting guidance information while the data broadcasting is being displayed; (b) requesting a guidance on the data broadcast; and (c) notifying the extracted guidance information in response to the request.

The method for guiding a data broadcasting further includes the step of (d) displaying the guidance information. The method for guiding a data broadcasting further includes the step of: (e) receiving the guidance information. The method for guiding a data broadcasting further includes the steps of: (f) inputting a response instruction on the guidance information; and (g) performing a navigation according to the inputted response instruction. The request is performed by pushing a guidance setting button key. The guidance information indicates the location of a button key to be pushed or location of a button key allowed to be pushed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates another example in which the data broadcasting is controlled using a bi-directional remote controller provided in the data broadcasting guidance system shown in FIG. 3;

FIGS. 7A and 7B illustrate an example in which the data broadcasting is controlled using a bi-directional remote controller provided in the data broadcasting guidance system shown in FIG. 3.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
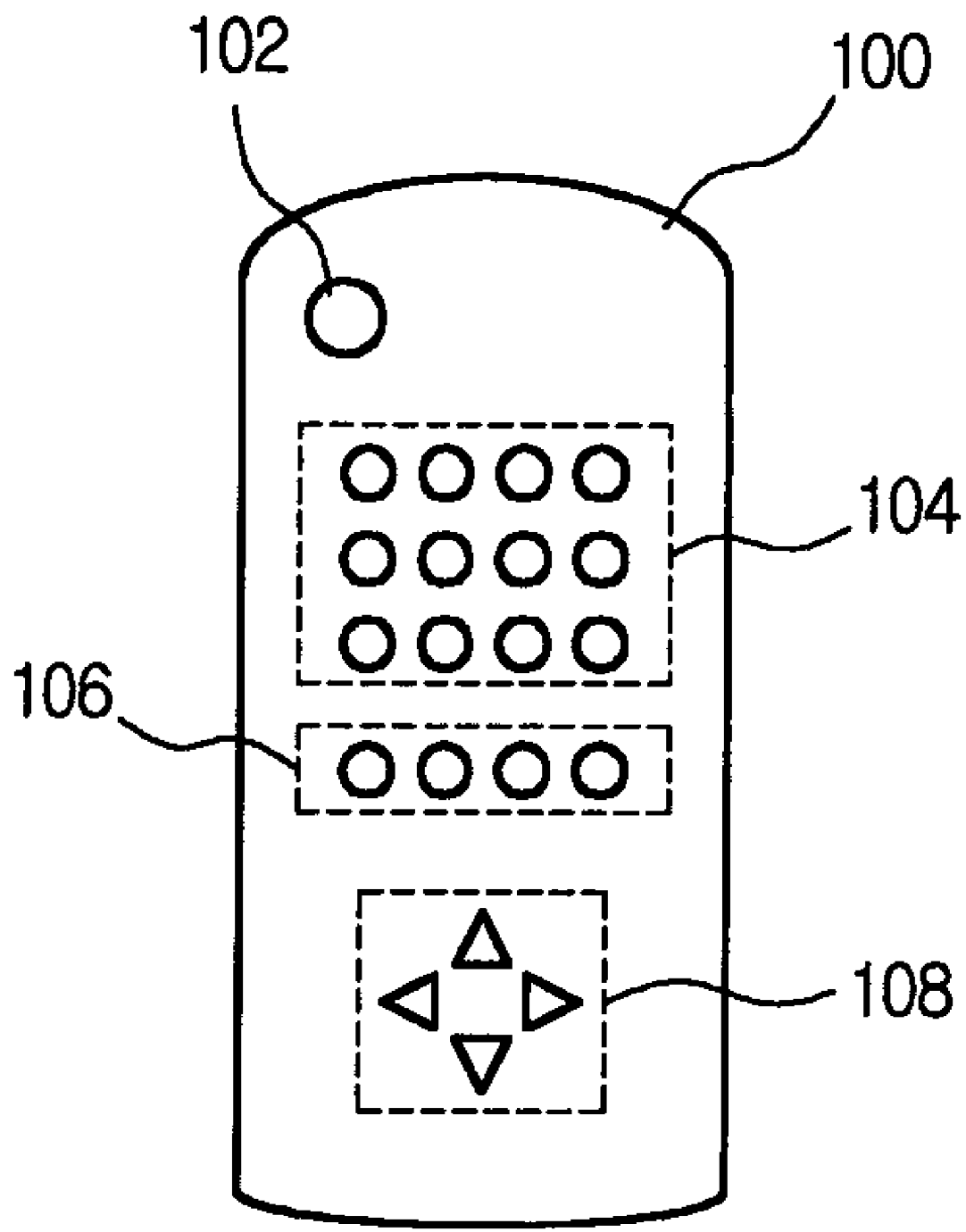
FIG. 1 illustrates a schematic view of a configuration of a general remote controller exterior.
Figure 2:
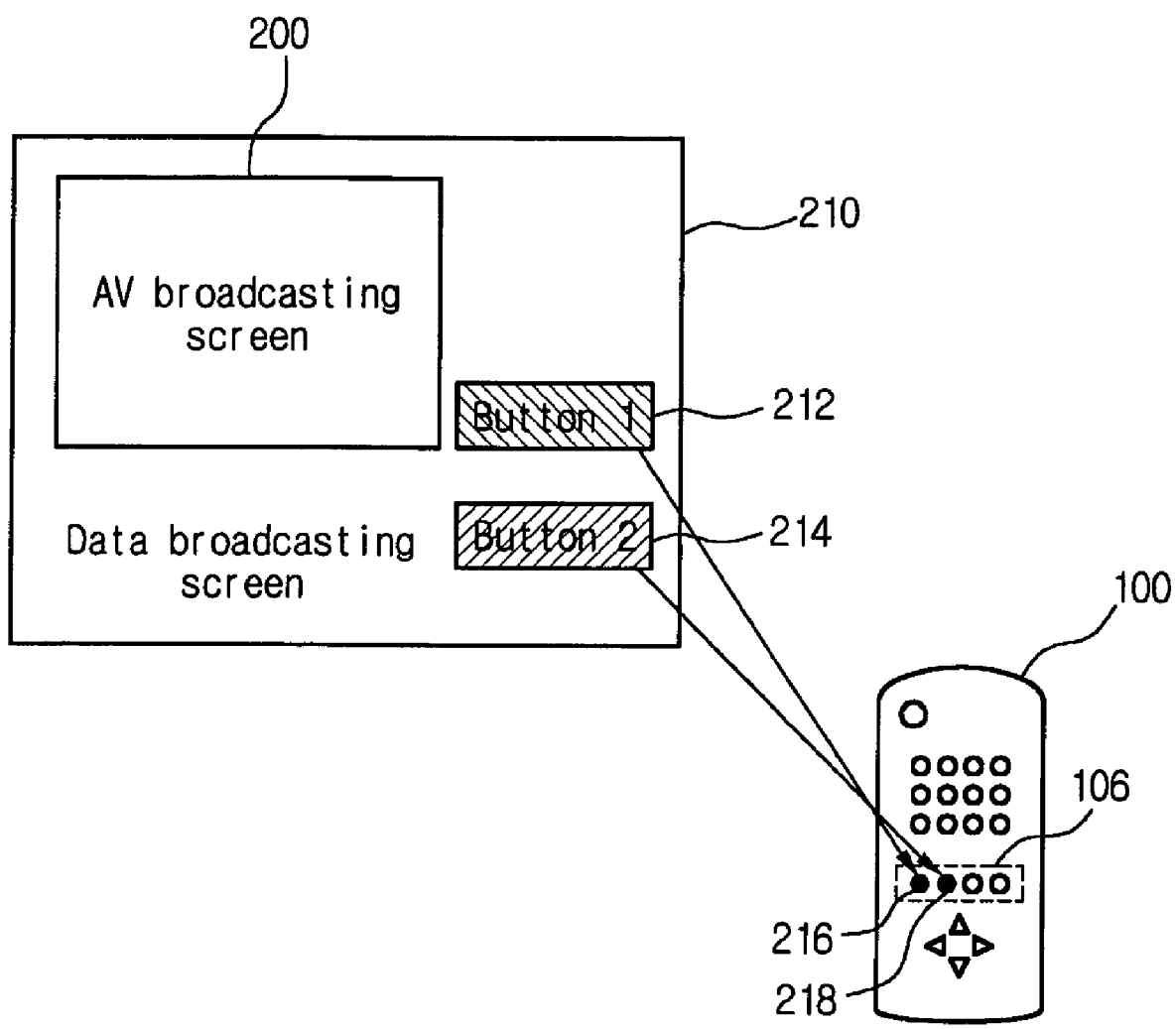
FIG. 2 illustrates that the data broadcasting is controlled using a general remote controller shown in FIG. 1.
Figure 3:
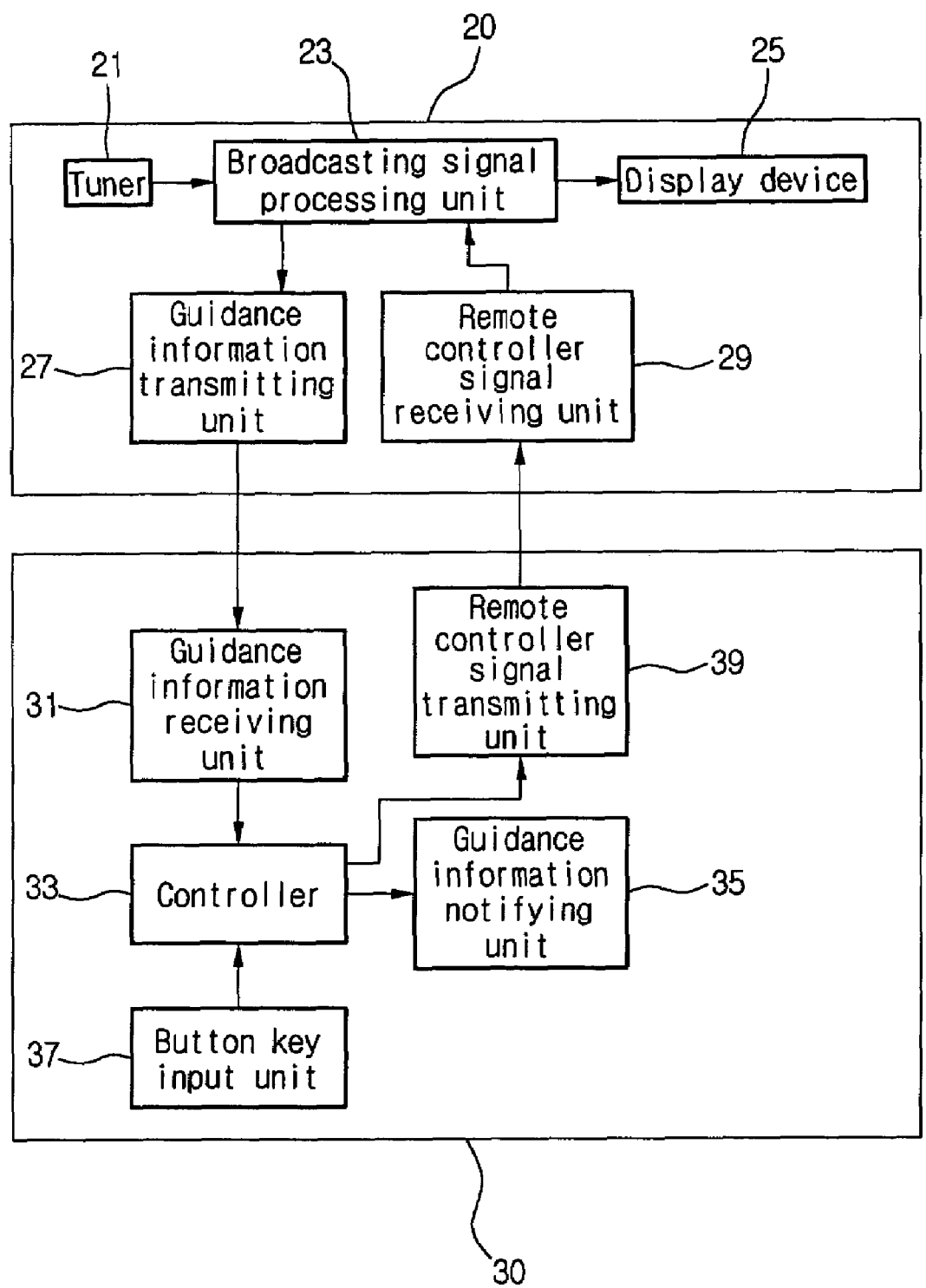
FIG. 3 illustrates a schematic view of a configuration of a data broadcasting guidance system according to a preferred embodiment of the present invention.

FIG. 3 illustrates a schematic view of a configuration of a data broadcasting guidance system according to a preferred embodiment of the present invention.

Referring to FIG. 3, the data broadcasting guidance system 10 performs data broadcasting, and includes a digital television 20 for providing a user with guidance information and a bi-directional remote controller 30 for requesting the digital television for the guidance information and notifying the provided guidance information.

The guidance information indicates the location of a button key to be pushed or location of a button key allowed to be pushed. Here, the button key allowed to be pushed implies the button keys that are allowed to be pushed. For example, a password or a credit card number is composed of a combination of various numbers. To complete the combination of various numbers, several button keys should be pushed. Accordingly, a mark, for example, light emission should be presented on the locations of the button keys by the guidance information.

In more detail, the digital television 20 includes a tuner 21 for receiving and tuning a broadcasting signal that includes a data broadcasting signal, a broadcasting signal processing unit 23 for controlling to display the tuned broadcasting signal, extracting guidance information from the data broadcasting signal and supplying the extracted guidance information in response to the request of the user, and a display device 25 for displaying the broadcasting signal supplied from the broadcasting signal processing unit 23.

In addition, the digital television 20 further includes a remote controller signal receiving unit 29 for receiving the request of the user and a guidance information transmitting unit 27 for transmitting the extracted guidance information in response to the request of the user.

The tuner 21 receives, demodulates and tunes a broadcasting signal on the channel requested by the user as well known. The tuner 21 of the present invention is preferably configured to further receive a data broadcasting signal besides the convention AV broadcasting signal. In the following description, the broadcasting signal means the combination of the AV broadcasting signal and a data broadcasting signal.

Generally, the broadcasting signal for the data broadcasting is received through the tuner 21. Similarly, the received broadcasting signal is divided into an AV broadcasting signal and a data broadcasting signal by a predetermined procedure so that only the AV broadcasting signal is displayed or the data broadcasting signal as well as the AV broadcasting signal is displayed depending on the request of the user.

The broadcasting signal processing unit 23 receives the tuned broadcasting signal from the tuner 21, divide the broadcasting signal into an AV broadcasting signal and a data broadcasting signal, and supplies them to the display device 25 according the user's request.

The broadcasting signal processing unit 23 extracts guidance information from the data broadcasting signal divided as described above. In other words, the data broadcasting signal includes various functions which the user should operate. Similarly, some of the various functions which the user should operate will work if the user just pushes the corresponding button but some of them such as a password and a card number require the user to push a number of numerical buttons.

Such a data broadcasting signal includes functions that should be operated sequentially by the user for a navigation.

Based on the various functions, the broadcasting signal processing unit 23 analyzes the data broadcasting signal and extracts guidance information including the button key that the user should push or is allowed to push.

The broadcasting signal processing unit 23 always extracts guidance information when it receives the corresponding data broadcasting signal through the tuner 21 even if the corresponding data broadcasting signal is being displayed or not according the request of the user.

The broadcasting signal processing unit 23 can be configured to extract guidance information only if the corresponding data broadcasting signal is displayed according the request of the user.

Anyway, the broadcasting signal processing unit 23 prepares or stores the extracted guidance information until the guide request of the user.

When the user requests a guidance, the request is provided to the broadcasting signal processing unit 23 through the remote controller signal receiving unit and the broadcasting signal processing unit 23 transmits the prepared or stored guidance information to the bi-directional remote controller 30 through transmitting unit 27 in response to the guide request.

The broadcasting signal processing unit 23 transmits the guidance information to the bi-directional remote controller 30 and also marks the corresponding button of the buttons in the data broadcasting signal being displayed on the display device 25 in some way at the same time when it receives guide request from the user.

If numbers and/or letters should be inputted to an input window for the data broadcasting signal being displayed on the display device 25, the frame of the input window can be displayed thick.

The display device 25 displays only an AV broadcasting signal or both an AV broadcasting signal and a data broadcasting signal supplied from the broadcasting signal processing unit 23 according to the user's request.

Meanwhile, the bi-directional remote controller 30 includes a guidance information receiving unit 31 for receiving guidance information supplied from the digital television 20, a guidance information notifying unit 35 for informing the guidance information received through the guidance information receiving unit 31, a button key input unit 37 for inputting a predetermined response instruction by pushing the corresponding button key according to a guidance information informed from the guidance information notifying unit 35, a remote controller signal transmitting unit for transmitting the response instruction inputted from the button key input unit 37 to the digital television 20, and a controller 33. Here, the controller does not any special function but supplies a remote controller signal transmitting unit 39 with the guide request inputted from the user and operates the guidance information notifying unit 35 according to the guidance information received through the guidance information receiving unit 31.

The information receiving unit 31 is a member for receiving the guidance information supplied from the digital television 20 and enables the bi-directional remote controller 30 to communicate interactively. In other words, the conventional remote controller is limited to supply only a predetermined instruction to the digital television simply but the bi-directional remote controller 30 with the guidance information receiving unit 31 allows the user to request the digital television 20 for a guide, receives the guidance information supplied according to this request and can operate the guidance information notifying unit 35.

Preferably, the guidance information notifying unit 35 is provided on the lower portion of the button key input unit 37.

Here, the guidance information notifying unit 35 is preferably a display device. Of course, the guidance information notifying unit 35 can be anything that is provided on the lower portion of the button key input unit 37 and marks to guide the user.

The button key input unit 37 is a button key consisting of a marker, for example, a light emitter triggered by the guidance information notifying unit 35. This button key or these button keys can be provided according to situation.

In other words, in the data broadcast, the functions such as 'confirm' and 'cancel' that work by one time manipulation require only one button key of the bi-directional remote controller 30 to emit light but the functions such as credit card number and password that work by manipulating a number of button keys require a number of the button keys of the bi-directional remote controller 30 to emit light.

Figure 4:
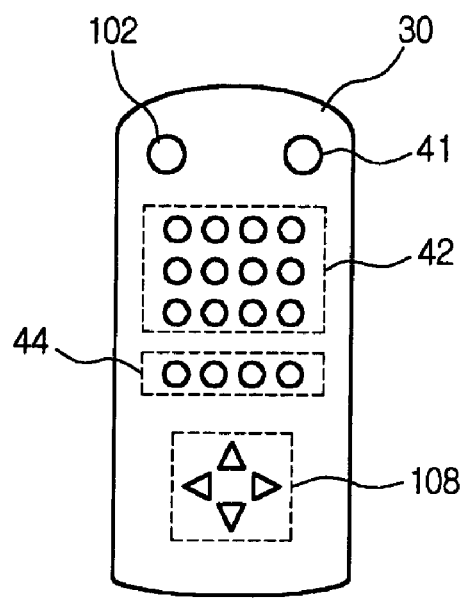
FIG. 4 illustrates a schematic view of a configuration of a bi-directional remote controller exterior provided in the data broadcasting guidance system shown in FIG. 3.

FIG. 4 illustrates a schematic view of a configuration of a bi-directional remote controller exterior provided in the data broadcasting guidance system shown in FIG. 3.

Referring to FIG. 4, the bi-directional remote controller 30 includes a power button key 102 to turn the power on or off, an arrow button key unit 108 including an up-arrow key, a down-arrow key, a left-arrow key and a right-arrow key, for controlling volume and channel, and a numerical button key unit 42 for inputting letters and numbers, a function key unit 44 including a confirmation key, a cancellation key and other function keys to control various data broadcast, and a guidance setting button key 41 for setting whether the user is allowed to request the guide. Here, the arrow button key unit 108, the numerical button key unit 42 and the function button key unit 44 include a plurality of button keys respectively.

Here, the arrow button key unit 108, the numerical button key unit 42 and the function button key unit 44 are the button key input unit 37 shown in FIG. 3. The guidance information notifying unit 35 is provided on the lower portion of each of button key units 108, 42 and 44.

The method for guiding the data broadcasting using the bi-directional remote controller 30 will be described.

Figure 5:
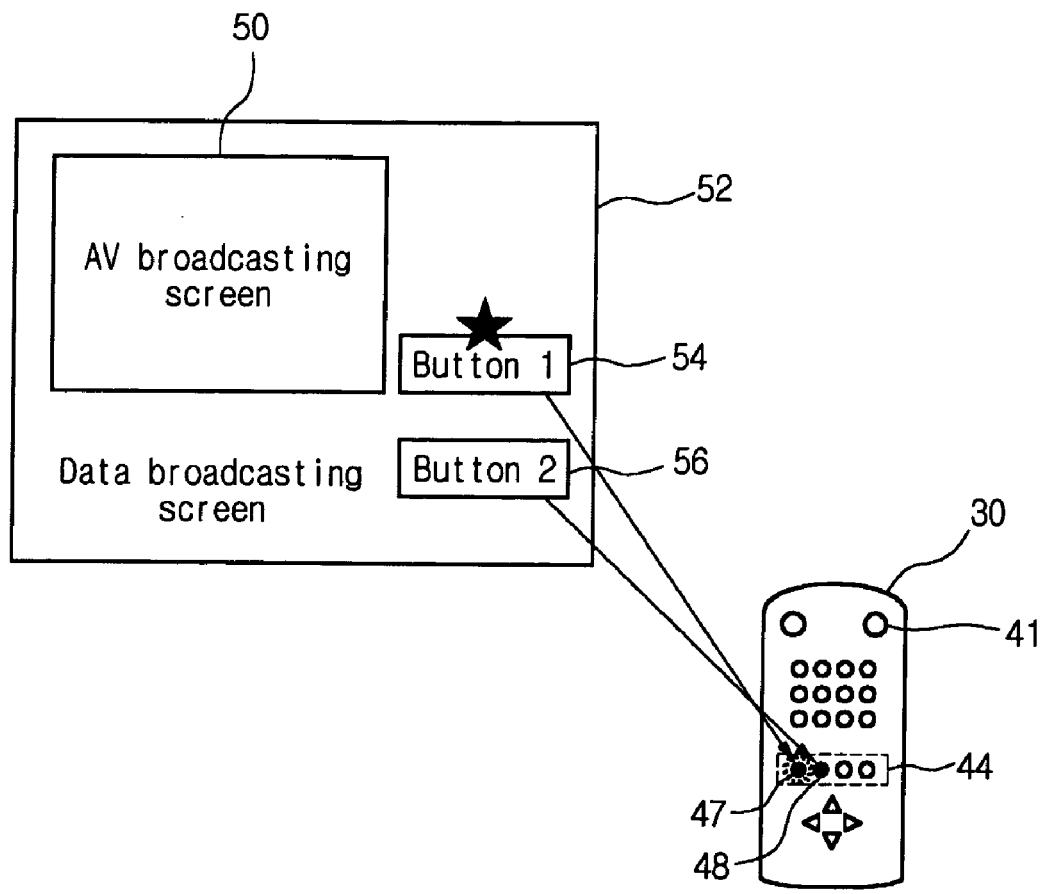
FIG. 5 illustrates an example in which the data broadcasting is controlled using a bi-directional remote controller provided in the data broadcasting guidance system shown in FIG. 3.

FIG. 5 illustrates an example in which the data broadcasting is controlled using a bi-directional remote controller provided in the data broadcasting guidance system shown in FIG. 3;

As shown in FIG. 5, the AV broadcasting signal and the data broadcasting signal are displayed on an AV broadcasting screen 50 and a data broadcasting screen 52, respectively.

A predetermined buttons 54 and 56 are displayed on the data broadcasting signal displayed on the data broadcasting screen 52. Here, these buttons 54 and 56 are corresponding to the button keys 47 and 48 provided in the function button key unit 44 of the bi-directional remote controller 30.

If the user pushes the guidance setting button key 41 to request for a guide, this guide request is supplied to the digital television 20 and the guidance information indicating the location of the button key corresponding to the request is supplied to the bi-directional remote controller 30. The corresponding button key 47 of the bi-directional remote controller 30 emits light according to the supplied guidance information. In other words, the button key 47 corresponding to the guidance information emits light.

The button 54 corresponding to the guidance information is marked on the data broadcasting screen 52 in some way.

For example, as shown in FIG. 5, if the button 1 54 being displayed on the data broadcasting screen 52 implies 'confirm' and the button 2 56 implies 'cancel', the button 1 54 is marked (that is, asterisked) according to the guidance information. Furthermore, a predetermined button key 47 of the bi-directional remote controller 30 emits light.

FIG. 6 illustrates another example in which the data broadcasting is controlled using a bi-directional remote controller provided in the data broadcasting guidance system shown in FIG. 3.

As shown in FIG. 6, there is provided an input window 62 to input price from the user to the data broadcasting screen 60 that is being displayed.

When the user should input price, at least one button should be pushed on the bi-directional remote controller 30.

Accordingly, if the user requests a guide using guidance setting button key 41, the digital television 20 supplies guidance information indicating the location of at least one button key to the bi-directional remote controller 30 in response to the guide request and the bi-directional remote controller 30 makes the numerical button key unit 42 including the at least one corresponding button key emit light according to the guidance information.

The digital television 30 displays thickly the frame of the input window 62 that is being displayed on the data broadcasting screen 60 according to the guidance information.

Figure 7B:
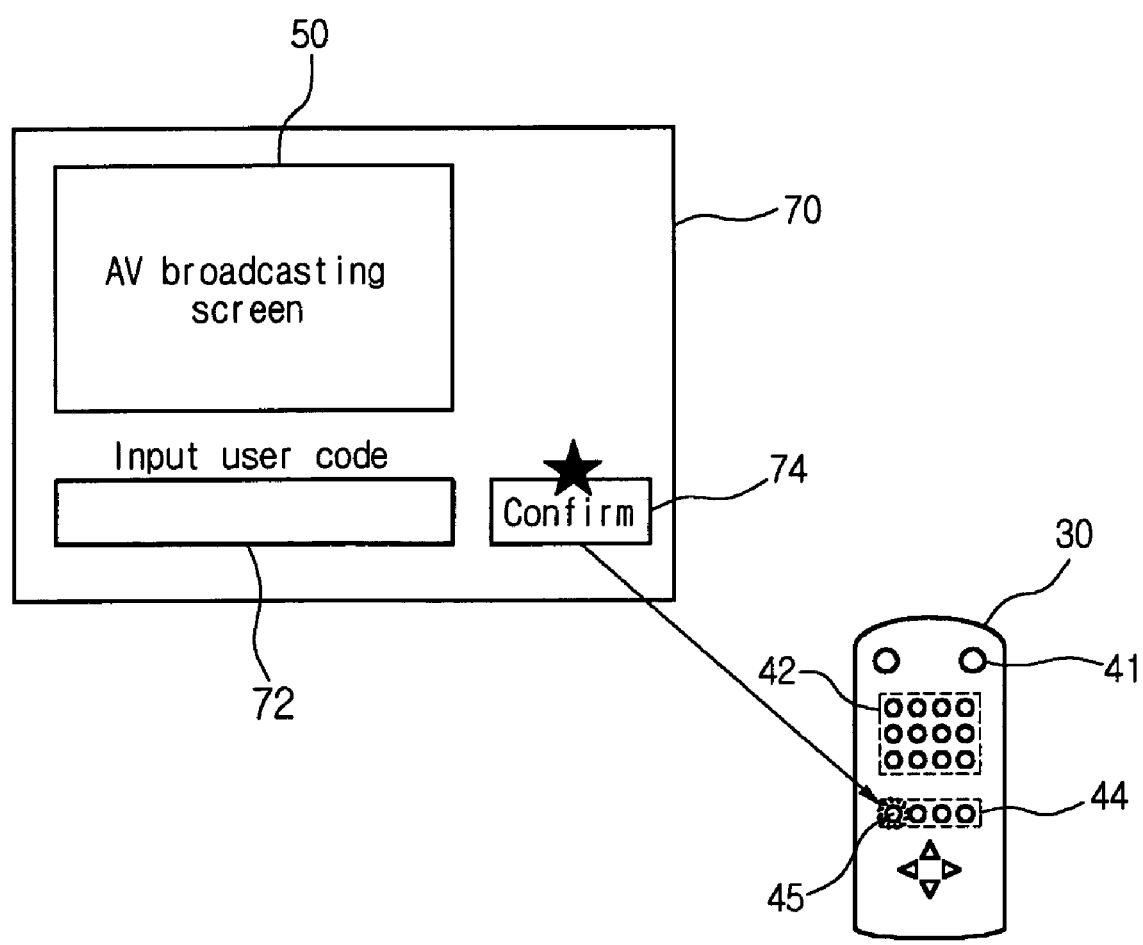

FIGS. 7A and 7B illustrate an example in which the data broadcasting is controlled using a bi-directional remote controller provided in the data broadcasting guidance system shown in FIG. 3.

As shown in FIGS. 7A and 7B, there is provided an input window 72 to input a user code to the data broadcasting screen 70 and a confirmation button 74.

Here, if the user requests a guide using the guidance setting button key 41, the digital television recognizes that the user code has to be inputted and supplies the bi-directional remote controller 30 with the guidance information indicating the location of at least one button key in response to this request.

Accordingly, a bi-directional remote controller 30 causes numerical button key unit 42 to emit light according to the guidance information.

Separately, the frame of the input window 72 displayed on the data broadcasting screen 70 is marked thickly according to the guidance information.

Here, if the user inputs a user code using the numerical button key unit 42 the digital television 20 recognizes the user's inputting the user code and supplies the guidance information to push the button key 'confirm' to the bi-directional remote controller 30 and the corresponding button key 45 of a function button key unit 44 emits light. The button key 'confirm' 74 that is being displayed on the data broadcasting screen 70 is marked specially, that is, asterisked.

Now, the method in which the user receives the guidance information from the digital television 20 using the guidance setting button key 41 has been described.

If the user would not like to receive the guidance information from the digital television 20, the user can cancel setting the guide by pushing the guidance setting button key 41 once again or by using the bi-directional remote controller 30 that further includes a guide setting cancellation button key (not shown). Or the bi-directional remote controller 30 is set in guide setting mode by default and the user turn on the bi-directional remote controller 30 in guide setting mode but the bi-directional remote controller 30 is automatically changed into guide setting cancellation mode at the elapse of a predetermined time so that the user does not receive the guidance information from the digital television 20.

Accordingly, while the user watches the data broadcast, the user can request a guide anytime if necessary and receive the guidance information so that the user can navigate on the data broadcast.

The description on the operation of the data broadcasting system configured as described above will be made.

Figure 8:
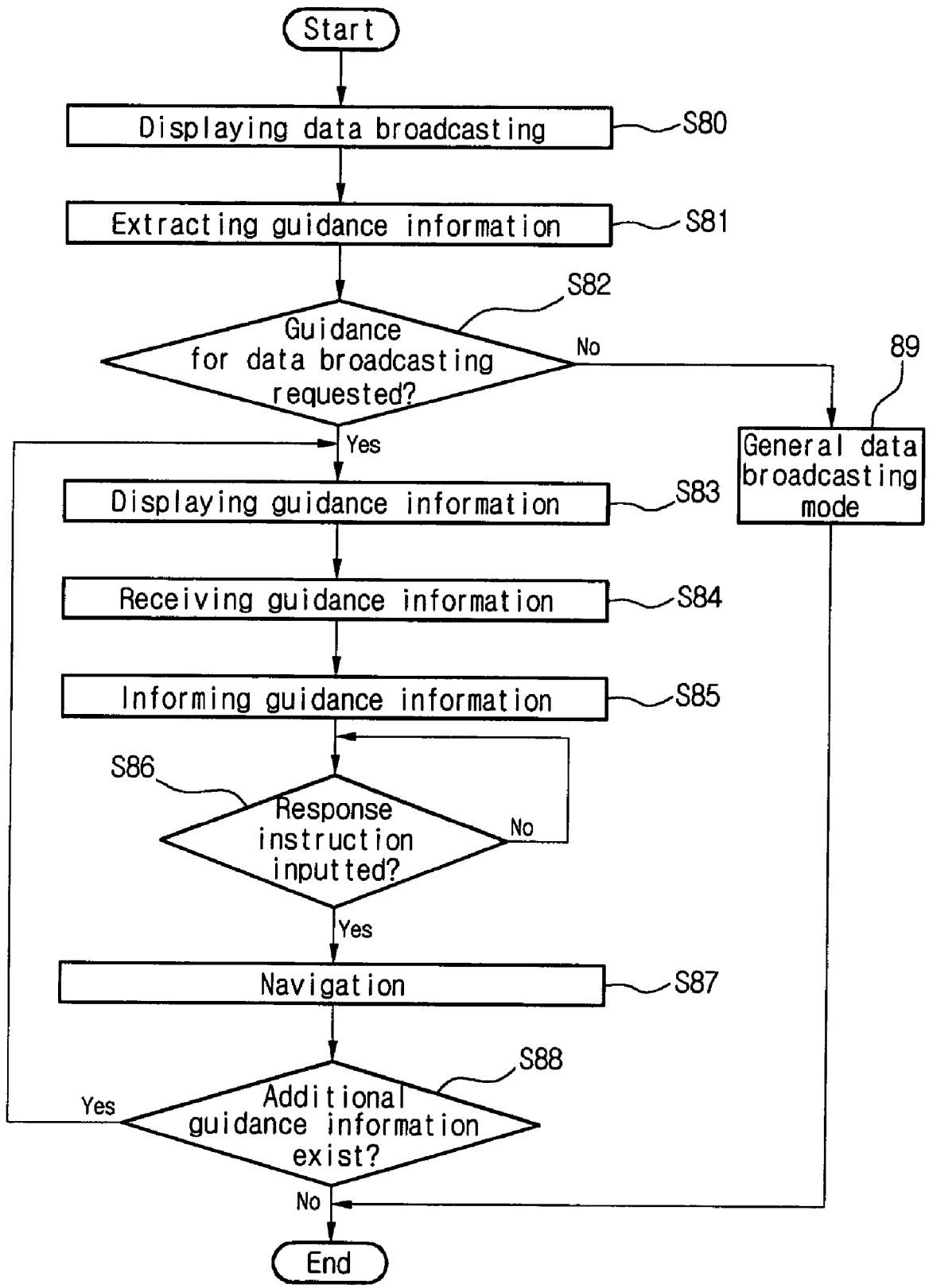
FIG. 8 is a flow chart illustrating a method in which the user controls the data broadcasting using guidance information in the data broadcasting guidance system according to a preferred embodiment of the present invention.

FIG. 8 is a flow chart illustrating a method in which the user controls the data broadcasting using guidance information in the data broadcasting guidance system according to a preferred embodiment of the present invention.

Referring to FIG. 8, if the user requests for the data broadcasting using the bi-directional remote controller 30, the digital television receives the broadcasting signal, tunes it by the tuner 21, divide the tuned broadcasting signal into an AV broadcasting signal and a data broadcasting signal and displays the AV broadcasting signal and the data broadcasting signal (S80).

Here, the digital television, particularly, the broadcasting signal processing unit 23 analyzes the data broadcasting signal and extracts the guidance information (S81). The extracted guidance information is standby or stored until the user requests.

On the other hand, if the user requests a guide using the bi-directional remote controller 30, particularly, the guidance setting button key 41 (S82), the digital television 20 displays a corresponding button or an input window on the data broadcasting screen according to the guidance information in response to the request (S83).

If the user does not push the guidance setting button key 41 and request a guide, the digital television 20 is in general broadcast mode and does not display the extracted guidance information on the data broadcasting screen (S89).

The digital television 20 displays the extracted guidance information as S83 and also supplies the bi-directional remote controller 30 with the extracted guidance information at the same time. Accordingly, the bi-directional remote controller 30 receives the extracted guidance information (S84).

The bi-directional remote controller 30 operates the guidance information notifying unit 35 according to the received guidance information and displays at least one button key (S85). Light emission can be used for this informing display but anything that is available for informing display can be used without limitation to the light emission.

If the user pushes the corresponding button key to display informing and inputs response instruction (S85), the digital television 20 navigates according to the response instruction (S87).

For example, if the response instruction is for a number or a letter, the corresponding letter or number is inputted and the next process is performed. On the contrary, if the response instruction is for a function such as 'confirm' or 'cancel', the corresponding operation is performed.

The digital television 20 determines whether there is any additional guidance information after navigation at S87 (S88).

If there is any additional guidance information, it goes to S83, otherwise, the process in which the guidance information is supplied is terminated.

Accordingly, the user requests a guide using a bi-directional remote controller and can receive the guidance information needed for the next operation.

The bi-directional remote controller is controlled according to this guidance information so that the user can use the information supplied from the data broadcasting more easily.

As described above, according to the data broadcasting guidance system and the method thereof of the present invention, while the user watch the data broadcasting, the button of the bi-directional remote controller corresponding the button to be pressed or allowed to be pressed is displayed so that the remote controller as complex as the various data broadcasting contents is controlled for the user to expand accessibility to the data broadcasting and the user can enjoy them conveniently.

According to the data broadcasting guidance system and the method thereof of the present invention, the users exactly and easily recognize the key which they should push while watching the data broadcasting so that the users actively watch the data broadcasting and the data broadcasting gets popular.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A data broadcasting guidance system comprising:
   means for extracting guidance information from a data broadcasting;
   means for requesting a guidance on the data broadcasting; and
   means for notifying the extracted guidance information in response to the request from the requesting means,
   wherein the guidance information is used for a user to operate at least one function being included in the data broadcasting, and
   wherein the requesting means and the notifying means are provided at a remote controller, and the extracting means is provided at a data broadcasting display device remotely controllable by the remote controller.

2. The data broadcasting guidance system according to claim 1, further comprising means for displaying the extracted guidance information in response to the request from the requesting means.

3. The data broadcasting guidance system according to claim 1, further comprising means for receiving the extracted guidance information in response to the request from the requesting means.

4. The data broadcasting guidance system according to claim 1, further comprising means for inputting a response instruction on the guidance information provided through the notifying means.

5. The data broadcasting guidance system according to claim 4, wherein the inputting means is a button key provided on a portion notified by the notifying means.

6. The data broadcasting guidance system according to claim 4, wherein the inputting means is a plurality of button keys provided on a portion notified by the notifying means.

7. The data broadcasting guidance system according to claim 1, wherein the requesting means is a guidance setting button key.

8. The data broadcasting guidance system according to claim 1, wherein the guidance information indicates the location of a button key to be pushed or allowed to be pushed.

9. The data broadcasting guidance system according to claim 1, wherein the notifying means is a display device.

10. The data broadcasting guidance system according to claim 1, wherein the notifying means is provided at a predetermined portion of the inputting means.

11. A method for guiding a data broadcasting, the method comprising:
    (a) extracting guidance information from the data broadcasting;
    (b) requesting a guidance on the data broadcasting; and
    (c) notifying the extracted guidance information in response to the request,
    wherein the guidance information is used for a user to operate at least one function being included in the data broadcasting, and
    wherein in the step (a), the guidance information is extracted by a data broadcasting display device while the data broadcasting is displayed on the data broadcasting display device; and in the step (c), the extracted guidance information is notified on a remote controller used to remotely control the data broadcasting display device.

12. The method according to claim 11, further comprising the step of (d) displaying the guidance information.

13. The method according to claim 11, further comprising the step of (e) receiving the guidance information.

14. The method according to claim 11, further comprising the steps of:
    (f) inputting a response instruction on the guidance information; and
    (g) performing a navigation according to the inputted response instruction.

15. The method according to claim 11, wherein the request is performed by pushing a guidance setting button key.

16. The method according to claim 11, wherein the guidance information indicates the location of a button key to be pushed or allowed to be pushed.

17. A bi-directional remote controller comprising:
means for requesting a guidance on a data broadcasting;
a remote controller for receiving guidance information provided from an outside in response to the request;
means for notifying the received guidance information at the remote controller; and
means for inputting a response instructions on the guidance information,
wherein the guidance information is extracted from the data broadcasting, wherein the guidance information is used for user to operate at least one function being included in the data broadcasting and at least one button key of the inputted means only emit light on the remote controller according to the guidance information.

* * * * *